Feb. 9, 1932. C. L. KENNEDY 1,844,093
INDUCTION MOTOR
Filed Jan. 15, 1929
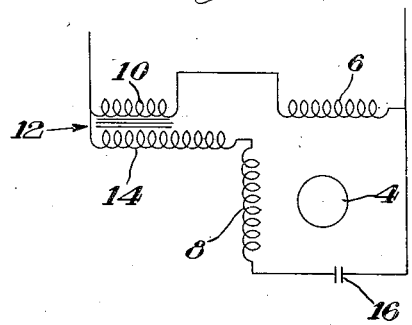
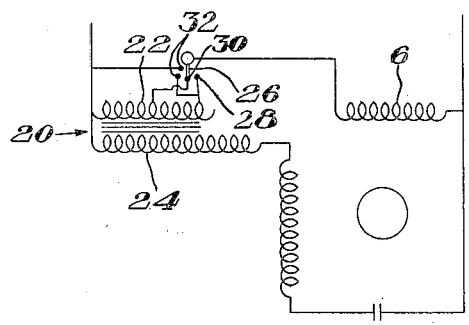
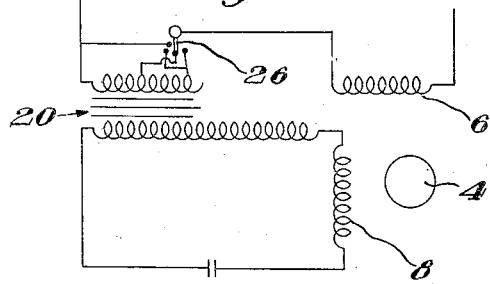

Patented Feb. 9, 1932

1,844,093

UNITED STATES PATENT OFFICE

CARLTON L. KENNEDY, OF BRAINTREE, MASSACHUSETTS, ASSIGNOR TO THE HOLTZER-CABOT ELECTRIC COMPANY, OF ROXBURY, MASSACHUSETTS, A CORPORATION OF MASSACHUSETTS

INDUCTION MOTOR

Application filed January 15, 1929. Serial No. 332,606.

The present invention relates to induction motors.

Single phase induction motors of the squirrel cage type possess the advantages of ruggedness and low cost but are open to the objections that they run at a low power factor and possess a low starting torque, and also that they require a high starting current. The power factor and efficiency of induction motors under running conditions may be improved by the use of a condenser circuit which includes a condenser in series with a condenser winding on the stator. But the use of such a condenser circuit does not materially improve starting conditions, because of the fact that although it may take a current having a component in quadrature with the main winding current, the magnitude of such current is so limited by the condenser that the starting torque is kept at a low value.

A further objection to the ordinary induction motor is that it usually affords no convenient means for control of speed.

One object of the present invention is to provide a condenser induction motor having a high starting torque with a comparatively low starting current.

Another object of the invention is to provide a condenser induction motor having provision for convenient control of speed.

With these objects in view, the principal feature of the present invention consists of a condenser induction motor having means for impressing on the condenser circuit a voltage which has a value in accordance with the current passing through the line winding. In the simplest form of the invention yet devised, such means comprises a transformer having its primary in series with the line winding and its secondary in the condenser circuit. Under starting conditions, when the line winding current is high, the high secondary voltage thereby generated acts to overcome the high reactance of the condenser and force an increased current through the condenser circuit. The action of the transformer is also to decrease the current through the line winding and therefore to permit a better balance between line and condenser circuits whereby the motor more nearly approximates a two phase motor under starting conditions. Furthermore, the total starting current which is the sum of the currents in the line and condenser circuits, is greatly reduced. Under running conditions, when the rotation of the rotor induces a back voltage in the windings, the transformer is of less effect, because of the decreased current in the main winding. At this time, however, a back voltage is induced in the condenser winding and the effect of this back voltage is to increase the apparent reactance of the condenser winding, thereby nullifying a part of the high capacitive reactance of the condenser and permitting a sufficient current to flow in the condenser circuit without the necessity for a high impressed voltage on the transformer secondary. Under all conditions, therefore, the condenser circuit carries a current which more nearly balances the current in the line winding and permits most efficient operation.

Another feature of the invention comprises a speed control by altering the secondary voltage impressed on the condenser circuit. This may be conveniently effected by any suitable means such as by varying the number of turns in the transformer primary whereby the main winding current therein will have greater or less effect on the condenser circuit.

Other features of the invention consist in certain novel features of construction, combinations, and arrangement of parts hereinafter described and particularly defined in the claims.

In the accompanying drawings, Fig. 1 is a diagram of the improved form of induction motor adapted for high starting torque with low starting current; Fig. 2 is a diagram of a motor similar to Fig. 1 but also having provision for speed control; and Fig. 3 is a diagram of a modified form of motor.

The embodiment of the invention shown in Fig. 1 comprises a motor having a rotor 4 and two stator windings, namely, a line winding 6 and a condenser winding 8 which are displaced in space phase from each other by an angle preferably approximating 90 electrical degrees. In series with the line winding 6 is the primary 10 of a transformer 12, the secondary 14 of which is connected in series with the condenser winding 8. The transformer 12 is external to the motor. For high starting torque, the secondary 14 should have a considerably greater number of turns than the primary 10. A condenser 16 is also included in series with the condenser winding. The secondary 14, the condenser winding 8, and the condenser 16, together form a condenser circuit which is connected across the line. The primary 10 of the transformer and the line winding 6 are also connected across the line. The electrical capacity of the condenser is as large as possible consistent with space requirements, but in no event is it made sufficiently large to bring about resonant conditions at any time, that is to say, the capacitive reactance of the condenser 16 is always greater than the inductive reactance of the remainder of the circuit, so that a leading current is caused to flow in the condenser circuit.

The operation of the motor shown in Fig. 1 will now be described. Under starting conditions, because of the fact that the rotor is stationary, the effective impedance of the line winding 6 is low and the main circuit therefore tends to draw a high current. The effect of this high primary current is to induce a high transformer voltage which acts in conjunction with the line voltage to force an increased current through the condenser circuit. It will be noted that at the same time the current in the main winding 6 is considerably reduced below its normal starting value because of the inclusion of the primary 10 of the transformer in series therewith. The result is that a better balance is effected between the main and condenser currents and the disadvantages of low starting torque and high current are therefore substantially avoided.

As the motor comes up to speed, the conditions are reversed. The rotation of the rotor now induces a back voltage in both of the windings 6 and 8, therefore increasing their apparent impedances. The transformer 12 becomes of considerably less effect because of the reduction of main winding current. The voltage induced in the transformer secondary 14 is also lessened. At this time, however, the augmentation of the line voltage on the condenser circuit is not necessary because of the fact that the increase in the apparent reactance of the condenser winding 8 serves partially to nullify the capacitive reactance of the condenser 16 so that a sufficient current now flows through the condenser circuit to maintain the proper balance. It will be seen that the voltage induced in the transformer secondary 14 bears a definite relation to the current in the main winding. Thus, when the main winding current is high, as at starting, the voltage impressed on the condenser circuit is increased and the condenser current circuit is also increased, whereas when the main winding current is small, as at full speed, the total voltage impressed on the condenser circuit is correspondingly reduced. The motor therefore effects a substantially complete balance of circuits under all conditions, as shown both in high starting torque with low current, and in high running efficiency with high power factor.

The motor which is diagrammatically illustrated in Fig. 2 is similar to that of Fig. 1 with the exception that provision is made for including a variable number of turns in the transformer primary, for the purpose of controlling the speed. The transformer 20 has the primary 22 and the secondary 24. By means of a selector switch 26, either the whole primary or a part thereof may be included in series with the main winding 6, or the transformer may be short circuited. To this end, a switch contact 28 is connected to the end of the primary, a contact 30 is connected to an intermediate point of the primary, and a pair of short circuiting contacts 32 are connected to opposite ends of the primary and are adapted to be bridged by the switch blade. Under running conditions, maximum speed will be attained when the primary is short circuited, that is, when the switch blade bridges the contacts 32. When the switch is placed on the intermediate contact 30, the voltage on the main winding is reduced because of the voltage drop through the transformer. When the entire primary is included, by switching on to the contact 28, the motor will run at a still further reduced speed. Although only one intermediate contact 30 is illustrated, as many may be provided as desired, permitting close adjustment of running speed. In general, the greater the number of primary turns included in series with the winding 6, the less will be the running speed. It will be seen that when the switch is in short-circuiting position, the motor will operate as an ordinary condenser induction motor, neither the primary nor the secondary of the transformer having any effect except for a slight resistance and leakage reactance in the secondary circuit. Inasmuch as the starting torque under the short circuited condition may be rather small, it is preferable to start the motor on either the intermediate contact 30 or the end contact 28, in either of which cases the operation is similar to that of the motor shown in Fig. 1.

A modified form of motor is shown diagrammatically in Fig. 3. In this construction, the rotor 4, the main winding 6, condenser winding 8, and transformer 20 are as shown in Fig. 2. However, the condenser circuit instead of being connected across the line as in Fig. 2, is closed upon itself, there being no conductive connection between the condenser circuit and the line. In this construction, current is caused to flow in the condenser circuit by virtue of the inductive coupling between the primary and secondary of the transformer and also between the stator windings through the rotor. The energy transferred to the condenser circuit depends as before upon the current flowing in the main winding. Thus, when the main winding current is high as at starting, the transformer secondary impresses a high voltage on the condenser circuit and as the motor comes up to speed, this voltage is reduced because of the reduction in the main winding current. The selector switch 26 may be provided for control of speed. Inasmuch as the condenser circuit is not conductively connected to the line, the transformer 20 will be designed with a higher turns ratio than in the construction of Fig. 2 if similar operating conditions are desired. It will be understood that with the switch in short-circuiting position, the motor has no starting torque. For either of the other positions of the switch, however, a transfer of energy is effected from the primary circuit to the condenser circuit through the transformer, and a high starting torque may be obtained. Under running conditions, as in the construction of Fig. 2, the inclusion of a greater or less impedance in series with the main winding serves as an effective speed control. By the elimination of a direct connection to the line, some advantages are obtained principal among which is the fact that voltages in the condenser circuit may be chosen entirely independently of the line voltage. Moreover, the insulation between the motor windings is improved because there is no direct metallic connection between them.

Having thus described the invention, what is claimed is:

1. An induction motor comprising a rotor, a stator having a main winding and a condenser winding, a condenser circuit comprising a condenser in series with the condenser winding, a transformer having its primary in series with the main winding and its secondary in series with the condenser winding and the condenser in the condenser circuit to impress on the condenser circuit a voltage which varies in accordance with the main winding current, the condenser circuit including the transformer secondary being connected across the main winding, and means for varying the number of turns of the primary or for short circuiting the transformer to vary the speed.

2. An induction motor comprising a rotor, a stator having a main winding and a condenser winding, a condenser circuit comprising a condenser in series with the condenser winding, a transformer having its primary in series with the main winding and its secondary in the condenser circuit to impress on the condenser circuit a voltage which varies in accordance with the main winding current, and means for short circuiting the primary to permit operation at higher speed.

3. An induction motor comprising a rotor, a stator having a main winding and a condenser winding, a condenser circuit comprising a condenser in series with the condenser winding, a transformer having its primary in series with the main winding and its secondary in the condenser circuit to impress on the condenser circuit a voltage which varies in accordance with the main winding current, the condenser circuit being closed on itself and inductively coupled to the main circuit through the transformer and the rotor, and means for varying the number of turns of the primary and for short circuiting one of the transformer windings to control the speed.

In testimony whereof I have signed my name to this specification.

CARLTON L. KENNEDY.